SCHEMATIC PLAN VIEW
CONVENTIONAL PROCESS

SCHEMATIC PLAN VIEW
THIS INVENTION

INVENTORS.
JOSEPH M. DEVITTORIO
THOMAS P. KINSELLA
BY:
McNenny, Farrington, Pearne & Gordon
ATTORNEYS

United States Patent Office 3,682,806
Patented Aug. 8, 1972

3,682,806
CATHODIC TREATMENT OF AN ELECTRO-COATING BATH
Thomas P. Kinsella, South Holland, and Joseph M. De Vittorio, Homewood, Ill., assignors to The Sherwin-Williams Company, Cleveland, Ohio
Filed July 15, 1970, Ser. No. 55,139
Int. Cl. B01k 5/02; B01d 13/02
U.S. Cl. 204—181                                           13 Claims

ABSTRACT OF THE DISCLOSURE

An ion exchange resin is captively held in fluid contact with a cathode and a permselective ion exchange membrane; the membrane divides a paint electrocoating bath into two main compartments, the anode compartment containing the paint composition to be coated onto an anode which is submerged in the paint bath, and a cathode compartment containing said resin. The instant process provides for removal of solubilizer ions in such a manner as to permit reconstitution of the main paint bath with from 90 to about 100% solubilized material. In one case, a strong-acid type ion exchange resin in the acid form is used, in the other, a fully neutralized or "loaded" ion exchange resin is used.

BACKGROUND OF THE INVENTION

Figure 1:
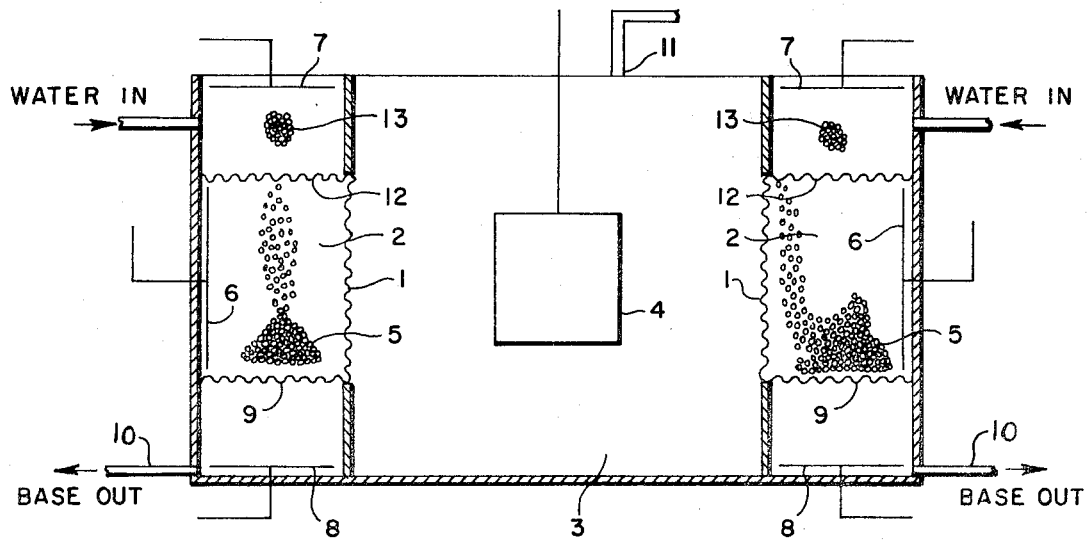

Early in the development of electrocoating processes the fundamental difference between this painting process and all other known paint applications became apparent. In spray painting and dip coating, the entire paint composition is transferred from a vessel or pot onto a workpiece and great care is taken to keep the paint composition uniform through agitation, so that any fraction leaving the pot should be the same composition as the remaining fraction. On the other hand, in the electrocoating process, only certain bath components are deposited on the workpiece and these are in relatively different proportions. The electro-coater does not deal with one given paint formulation but with two formulations: the bath and the feed. In this process, if the starting material in the bath contained a pound of paint solids and a pound of water and subsequently the pound of paint solids are coated out and then replaced by a pound of paint solids, the inventory of the bath is said to have been turned over once. The ideal situation is to have all the analytical problems of bath composition and film composition solved so that a bath operates through a plurality of turnovers, under complete control and has virtually an infinite life.

It is unnecessary to state that in a continuous industrial electrocoating process the cost of quality-coating the article is the dominant factor. This cost of coating an article involves the cost of the paint, the pigment used, the solubilizer, the cost of electric power to provide adequate throwing power of the paint onto the articles, the time interval during which an article may be satisfactorily coated, the frequency of reconstitution of the electrocoated bath and the cost of the constituents used in reconstituting the bath, and less importantly, the cost of solubilizer and replacement of lost solubilizer.

A typical electrocoating process employs a uniform direct current potentail and the surfaces to be coated are biased anodically in a D-C circuit. However, several processes utilize an alternating current superimposed on the D-C potential, or in some instances the conducting substrate to be coated can be the cathodic electrode of the system. The coating bath is relatively resistant to current flow and migration of the colloidal organic polymers is effected by charging the polymeric moiety negatively. In the case of solubilized polymers, such as carboxylic acid resins, the neutralization of the polymer in an aqueous medium provides charged sites which permit the film-forming polymer to be deposited on an anode because it has been solubilized by the addition of alkali metal hydroxide, ammonia or amines. The dispersing phase in the electrocoating bath is water containing bases which establish a desired pH, and the electrical charge of the polymeric particle in relation to the aqueous bath determines the direction of migration under a direct current potential.

Depletion of the polymeric component of the bath requires that the bath be reconstituted with additional polymer continuously, or intermittently, to sustain the solids content of the bath at a predetermined operating level. In most electrocoating baths, the dispersing agent (solubilizing material) is retained and becomes more concentrated in the bath after deposition of the dispersed polymeric material on the conductive surface, and the ion-rich bath (solubilizer ions) is used to solubilize a solubilizer-deficient stream. An alternative method of maintaining the optimum level of solubilizer, is to remove excess ions from the bath to prevent a build-up which will ruin the equality of the coating.

It is known that several methods of removal of excess solubilizer which contaminates the bath have been suggested: (1) using Graver Hi Sep 70 or other similar membranes in a dialysis system; (2) a plastic grid and kidney-type cell in the electrodialysis system; or (3) an ion exchange system such as the one in which the paint bath is pumped through Rohm and Haas IRC 50 ion exchange resin. (See "Ford Electrocoating Process: Principles of Process, Feed and Engineering," Materials Protection, p. 37–39, October 1968). The cited article particularly contemplates the use of an ion exchange resin exteriorly from the electrocoating paint bath; it depicts withdrawal of a solubilizer-rich stream from the contaminated bath which is then ion exchanged in a separate vessel to remove excess solubilizer ions; the aqueous stream which leaves the ion exchange vessel contains pigment, fully solubilized resin and no excess amine ions, and is returned to the bath.

The inherent disadvantage of such an outside-regeneration process is that it requires a build-up of the amine solubilizer in the main electrocoating bath to a relatively high level before it is ion exchanged. Often, by this time, the level of solubilizer is high enough to affect adversely both the quality of the paint film deposited, as well as the requirements to throw the paint. When the paint bath is finally pumped through the ion exchange resin, a relatively small amount of solubilizer-rich paint is immediately contacted with a relatively large mass of resin, resulting in such a severe strain on the stability of the polymeric film-forming material that solids and pigment from the paint are "kicked out" onto the ion exchange resin, effectively, "gumming up" the bed (see "Electroplating" by Robert Draper P-169 article by R. L. Yeates). The process of the instant invention bypasses this predicament and permits ease of coating with a minimum of complicated analytical problems which usually have to be solved by a painstaking trial and error process.

In the prior art, in the particular case where an alkali metal hydroxide is used as the solubilizer, the initial paint is mixed with sufficient base to give the necessary stability and deposition quality. During continuous electrocoating, the base is regenerated at the cathode, and when reconstitution becomes necessary, the base which is in the tank is used to help solubilize the makeup material. A definite ratio of alkali metal hydroxide to carboxyl polymer groups is used to make the initial paint mixture for the bath, such ratio having been established as optimum for paint stability in the tank and for good smooth paint deposition. When the makeup paste is prepared this way, it is said to be 100% solubilized. For any given quantity of paint coated onto the workpiece, about 80% of the alkali metal hydroxide initially associated with the paint will be regenerable as lithium hydroxide (say) or the conjugate base of the reaction of Li OH and the carboxyl group of the polymer, and accordingly the makeup material need only be approximately 20% solubilized. In other words, the makeup material can only contain from about 15 to 25% of the solubilizer initially used in the bath if the solubilizer concentration in the bath is to be maintained at its original level. However, when only 20% of the base lithium hydroxide is used to solubilize the makeup material, difficulty is encountered in reconstituting the paint, indicative that 20% solubilizer just doesn't have enough solubilizing effect for particular coatings. Therefore, it is found more desirable to utilize from about 60–100%, and preferably from 80–100%, solubilized material as makeup and to continuously remove the base regenerated during electrocoating by removing this base from the cathode compartment by some means which either ties it up or gets rid of it by flushing. Under the circumstances, the natural approach to solving the problem would be to monitor the concentration of regenerated base in the bath and to incrementally add those quantities of makeup material with sufficient solubilizer in it so as to maintain the base concentration in the electrocoating bath, at the same time to utilize high enough solubilizer concentration in the makeup material that difficulty in reconstituting the makeup material is not encountered. However, it will be appreciated that such an approach involves constant analysis and frequent computations with the frequently vain expectation that the makeup material with the correct analysis will be provided at the proper time when the electrocoating bath has reached the predicted concentration.

A side effect of this differential method of frequent bath additions is that buildup of free base requires an inordinate increase in amperage if the paint were fully solubilized and completely neutralized. Thus, the power consumption for the process skyrockets with a concomitant decrease in efficiency unless the frequency of reconstitution is impractically high. The instant process unexpectedly avoids such a power penalty, despite infrequent reconstitutions, in that the lithium ions are traveling to the cathode while the acid moiety travels to the anode in the coating process. Thus, ions are traveling in the electrocoating bath in both directions, negative ions going to the workpiece, positive ions going to the cathode compartment stoichiometrically, which makes for an extremely efficient electrical process. In the meanwhile, though the ions do travel through the permselective ion exchange membrane into the cathode compartment, the lithium ions are immediately tied up by a reaction with the ion exchange resin in the acid form:

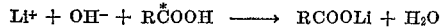

and they are unable to travel back through the membrane even if an upset in the coating conditions should occur.

It is critical for the progress of this reaction that OH⁻

*Wherein R represents an organic resin moiety.

ions be generated at the cathode, and they are, by the reaction

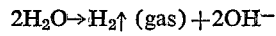

evidenced by vigorous gas evolution. It is because OH⁻ ions are generated at the cathode, vacant sites are left on the ion exchange resin which sites had been occupied by H⁺ ions. If it were not for the cathodic generation of OH⁻ ions, the low ion exchange potential of lithium ion, which is below hydrogen ion in a series tabulating relative selectivity coefficients of sulfonic cationic exchange resins (see Table 6, p. 30, of "The Theory and Mechanism of Ion Exchange" by Kunin; John Wiley, 1958) would preclude Li⁺ being exchanged for H⁺ in the cation exchange resin.

A particularly unobvious facet of the instant invention is that, despite the apparent waste of expensive base solubilizer material due to its being tied up by an ion exchange reaction (for subsequent reuse and recovery) an overall economy of the process is effected, with improvement in capability to throw a large quantity of paint in a very cohesive and flawless film, at electrical efficiency that approaches 100%, and a solubilization or reconstitution efficiency which can equal 100%, indicating that solubilization during reconstitution is just as easy as during the initial filling of the bath.

It is well at this point to distinguish between electrical efficiency and solubilization or reconstitution efficiency. In other words, the ratio of the actual number of coulombs required to deposit a gram of coating to the number of coulombs theoretically required to deposit a gram of the same coating is the actual electrical efficiency of the electrocoating bath. Solubilization efficiency is measured by the percent solubilization of the make-up paint or feed stream which is added to the bath. In other words, where a 100% solubilized material is continuously added to the bath or added to the bath at intervals of time over a continued period of coating, then the solubilization or reconstiution efficiency is said to be 100%. Where however, the solubilization of the make-up paint is 80%, then the solubilization efficiency is 80%; it is really an index of how much of the excess solubilizer from the coating bath has been removed by the ion exchange resin-membrane combination, plus that which has been removed by pulling out the workpiece. It is a measure of the efficiency with which the ion exchange resin removes excess solubilizer ions. A major benefit which is derived from operation with high or essentially 100% solubilization efficiencies, is that it permits sudden addition of make-up paint, or at a rate which is many times greater than the slow rates now predicated by the ability of a base-rich bath to incorporate solubilizer-deficient feed. It has been found, as might be theoretically predicted, that higher electrical efficiencies are concomitant with higher solubilizer efficiency.

It will be apparent that the instant invention involves electrodialysis and, more generally, is a means for effecting transfer of undesirable ions liberated in electrocoating baths into another solution separated from the bath by a membrane. The membrane may have either a positive or a negative fixed ionic charge depending upon whether or not the ions to be removed from the electrocoating bath are negative or positive. Membranes with negative fixed charge will repel anions but permit the passage of cations. Such membranes are called cation ion exchange membranes. It will be apparent that electrodialysis effects the change of concentration of ions in solution without significantly affecting the concentration and composition of the non-ionic constituents of the solution. What is quite unapparent is that, in addition, the instant process does not affect the concentration of the coating material. The net result is similar to ion exchange. However, whereas ion exchange derives its energy from the chemicals used in regeneration, electrodialysis utilizes electrical energy. Economically, electrodialysis lends itself to processing more concentrated solutions than ion exchange. The instant invention includes a combination of selective electrodialysis and ion exchange which permits efficient coating of articles for extremely long periods of time, simultaneously permitting extremely high solubilization efficiency. Thus, problems due to resistivity and dissipation of heat energy, so common in electrocoating baths, coupled with pH changes due to fluctuating ion concentration (which pH changes tend to precipitate pigment from the bath), are avoided. Because of the pH problem current electrodeposition baths are buffered, there being an excess of COOH groups always present. With removal of the base, this could be avoided and resins with lower acid values could be used.

In particular, the instant invention relates to an improved method of electrocoating with a multi-component paint wherein a coating bath is formed by dispersing within an aqueous medium a synthetic organic resin having a plurality of water ionizable functional groups within its molecular structure, and a water-ionizable solubilizer for the resin, the dispersed resin being converted into an essentially water insoluble coating upon passage through the electrocoating bath of a direct electrical current. Utilization of an ion exchange resin in a compartment separated from the electrocoating bath by a cation (say) permeable membrane permits selective electrodialysis of unwanted ions in the electrocoating bath which are not discharged at the cathode but forced to fill sites left vacant on the ion exchange resin by the migration of $H^+$ ions to the cathode and by the generation of $H_2$ gas. Therefore, the concentration of desired ions in the electrocoating bath is maintained until all the ion exchange resin is converted to the lithium form.

The film-forming material employed in an electrocoating process of the type contemplated herein may constitute the sole coating material within the bath or it may include or be employed with pigments, metallic particles, dyes, drying oils, extenders, etc., and may be dispersed as a colloid, emulsion, emulsoid, or apparent solution. The primary resin employed in the film forming binder may include alkyd resins, acrylate resins, epoxy resins, phenol-formaldehyde resins, hydrocarbon resins, other organic resins or mixtures of one or more of the foregoing resins with another of the resins hereinbefore mentioned, or with other film-forming organic materials including binding agents and extenders conventionally employed in paints. Such materials may be reacted with or accompanied by other organic monomers and/or polymers including hydrocarbons and oxygen substituted hydrocarbons such as polyols, carboxylic acids, ethers, aldehydes and ketones.

The reaction at the cathode, to which the preferred embodiment of this invention is directed, is essentially independent of the reaction at the anode and is generally applicable to any anodic coating deposition and will occur as long as cations infiltrate the membrane to insure electrical neutrality.

Where the film-forming material is to be deposited anodically, the resin will have free or water-dissociable carboxyl groups or their equivalent within the resin structure. Film-forming materials that are particularly suitable for anodic deposition include coupled siccative oils, e.g. coupled glyceride drying or semi-drying oils such as linseed, sunflower, safflower, perilla, hempseed, walnut seed, dehydrated castor oil, rapeseed, tomato seed, menhaden, corn, tung, soya, and the like, the olefinic double bonds in the oil being conjugated or or non-conjugated or a mixture, the coupling agent being an acyclic olefinic acid or anhydride, preferably maleic anhydride or an acyclic olefinic acid such as acrolein, vinyl acetate, or even a polybasic acid such as phthalic or succinic. Dispersion of these polycarboxylic acid resins in water is assisted by the addition of a suitable basic material such as water soluble amines, mixtures of monomeric and polymeric amines, and most preferably the alkali metal hydroxides.

Where the film is to be deposited cathodically, the primary resin may include one or more of the aforementioned resins having functional groups that ionize in the bath leaving the resin particle with a plurality of positive ion sites. Such groups may be amine or substituted amine groups e.g., quaternary ammonium groups. The conditions of operation are such that the water dispersibility of the resin, when it contacts the cathode, is extremely low. Dispersion of the latter film-forming materials is effected by the addition of suitable acidic materials such as water soluble carboxylic acids; example, formic acid, acetic acid, propionic acid, and suitably modified or buffered forms of certain inorganic acids.

In accordance with this invention, an electrode in fluid communication with the aqueous coating bath and of opposite polarity with respect to the other electrode (which is the object being coated), is isolated from the object by a selective electrodialysis membrane; ions which are liberated from the solubilizer in the electrocoating bath, and which progress from the bath into a compartment on the opposite side of the membrane by passage therethrough, are reacted with an ion exchange resin. Alternatively, in another embodiment, where the ion exchange resin is fully neutralized, the ions are flushed out of the cathode compartment. The membrane is formed of a conductive material having pores the diameters of which are limited by a predetermined maximum in accordance with the size of the ion to which the membrane is to be permeable, and not by the size of the macro-molecules in the electrocoating bath to which it is to be impermeable. The use of ion exchange resins to remove excess solubilizer is known and has been tried despite its disadvantages; similarly the use of a permselective ion exchange resin is known, and this has also been utilized despite its disadvantages (see "Solubilizer Balance In the Electrodeposition of Paint," Burnside, et al., Journal of Paint Technology, vol. 41, No. 534, July 1969, pp. 431–437). Unexpectedly, the combination of a permselective ion exchange membrane with an ion exchange resin either in its reactive state or in a fully neutralized condition, negates the disadvantages of each, when used separately, for reasons given herein.

The advantage of the instant process over prior practice includes operating stability of the paint bath, even deposition in a self-limiting thickness, speed of coating with very high electrical efficiency, and most of all the ability to use essentially totally solubilized material to reconstitute the paint bath with film-forming materials, which, because of their insolubility require a high degree of both neutralization and solubilization, and which cannot effectively be taken up by a bath which must rely on the build-up of excess base in it. The paint can be completely formulated and finished at the paint supplier's plant. Certain limitations on the resinous coating such as viscosity, equivalent weight and molecular weight limitations can be broadened. The resin can be solubilized immediately after preparation, imparting to it a degree of homogeneity which facilitates the handling and transportation of viscous resins and paints.

When an ion exchange resin which is either in the unneutralized or in an essentially fully neutralized condition is used in the cathode compartment, the resistance of the cathode compartment is decreased, permitting the flushing out of mobile conductive ions with very pure water, which would otherwise be impractical because of the concomitant increase in electrical resistance of the catholyte. This results in a lower potential drop across the cathode compartment and therefore a lower total potential drop across the bath and a more stable electrical potential at the workpiece. Lower potential drop is dispositive of lower electrical costs to coat the workpiece, and stable potentials at the workpiece result in uniform coatings.

Another operating advantage of the instant process is that the bath viscosity which is of critical importance in large scale operations, is maintained within extremely narrow limits. If this viscosity is not maintained substantially constant, electrical energy is converted to bath heat and tends to build the temperature of the bath to high levels since there is a relatively small area per unit volume of bath to which the built up heat can be dissipated. Thus, as viscosity goes up, the efficiency of heat transfer, with cooling devices inside of and outside of the bath and from the tank walls themselves, decreases substantially. Drainage from the coated articles as they are withdrawn from the bath is distinctly inferior as the viscosity of the bath rises. The instant process permits the temperature of the bath to be controlled within a range of 5° C. for those articles which cannot be acceptably coated if the temperature fluctuates more severely.

It is essential to note that in the instant process the cations which pass through the membrane are not discharged at the other electrode but on the ion exchange resin in the cathode compartment. Thus, where an unneutralized ion exchange resin is used to attract and discharge ions, it is unnecessary to periodically or continuously remove any discharged solubilizer or neutralizer from the cathodic compartment out of the system. Where an essentially fully neutralized ion exchange resin is used in the cathode compartment, clearly the ions cannot be discharged on the ion exchange resin, and therefore must be flushed out. It is well recognized that the flushing of compartments, on either side of the membrane, is a requirement which would better be avoided. Flushing is disclosed and discussed in British Pat. No. 1,106,979. The comment with regard to continuous flushing to maintain the pH value is of particular significance since in the instant process the pH of the cathode compartment is of little concern—a direct result from combining the use of ion exchange resin and the cation exchange membrane. Thus, in the instant process the pH value may fluctuate without causing an upset in the electrocoating bath. What is not apparent from the British patent is that, along with pH fluctuation, the resistance of the bath also fluctuates as a result of changing compartment resistance, causing immediate problems of operation and resulting in damaged, blistered and low-gloss coatings. The combination of the instant process eliminates fluctuating bath resistance.

It is important to note that when an electrocoating process is carried out utilizing an ion exchange resin with a conventional dialysis type membrane such as regenerated cellulose, the electrocoating bath is contaminated unless adequately flushed. Particularly noteworthy is the disclosure in U.S. Pat. No. 3,304,250 (Gilchrist) which deals exclusively with conventional dialysis membranes and in which a high concentration of amine is required to keep a substantial fraction of the amine solubilizer un-ionized and, hence, dialyzable. Such a system results in the pH of the electrocoating bath being in the neighborhood of about 10, at which pH the results of the electrocoating process are totally unacceptable. Note that where, as in the Gilchrist patent, the cathodic compartment is continuously flushed, small changes in concentration of ionic material cause large changes in resistance therein so that the deposition current fluctuates and the film uniformity suffers. It is this major drawback which Cooke in U.S. Pat. No. 3,419,488 has attempted to solve by requiring the use of salts in the cathodic compartment so as to lower the compartment resistivity, and, at the same time, requiring the use of an ion exchange membrane to prevent the risk of contamination of the bath with the salt. We obtain the same result, among others discussed hereinabove, more effectively, by using a solid ion exchange resin which has low electrical resistance and absolutely no electrolytic mobility i.e. its electrolytic transport number is 0. The instant invention overcomes the disadvantage of both the Cooke and the Gilchrist disclosures and permits the use of a highly efficient process with little risk of coating malformation or contamination by anions such as $Cl^-$, $SO_4^=$, or $HCO_3^-$.

SUMMARY OF THE INVENTION

It is an object of the instant invention to provide a process for the electrocoating of conductive materials in an electrocoating bath separated from an electrode on the opposite side of the membrane, the membrane dividing the bath into two compartments. One electrode is in fluid contact with a fluid-permeable ion exchange resin which is in one compartment, but separated from the electrocoating bath in the other compartment by the membrane, which is selectively permeable and conductive.

It is another object of the instant invention to provide a process for electrocoating metallic articles with carboxylic film-forming materials utilizing lithium hydroxide as solubilizer, permitting lithium cations to be generated in the bath and to be directed away from the material to be coated through a conductive semi-permeable cation-exchange membrane and into a fluid permeable ion exchange material, which, because of sites left vacant by $H^+$ ions which react with $[OH^-]$ ions, effectively coacts with the lithium cation to engage it, in a cathodic compartment separated from the anodic electrocoating bath.

It is still another object of the instant invention to provide a process in which an ion exchange resin and an electrodialysis semi-permeable membrane work in combination to fix solubilizer ions which are liberated in the electrocoating bath, by quickly removing them from the bath, thus permitting the reconstitution of electrocoating bath with from 80–100% solubilized makeup feed material, at the same time permitting channeled migration of ions in the bath in both directions, to and from both the anode (which is the article being coated) and the cathode (which is the electrode in fluid contact with the fluid-permeable ion exchange resin).

It is still another object of the instant invention to provide a process for the continuous depletion of unwanted ions from the coating compartment of an electrocoating bath, which may be effected by contacting with an ion exchange resin isolated from said coating compartment and in the absence of any pigment, so as to permit easy and efficient cation exchange on the ion exchange resin surface, and subsequent regeneration of the resin, either outside the cathode compartment, or without removing the resin from the cathode compartment, by regeneration with electrodialysis using auxiliary electrodes.

It is still another object of this invention to provide a process for the continuous electrocoating of metallic articles which form one electrode in an electrocoating bath, and to provide a means for reconstituting the bath with about 100% solubilized film-forming material in such a way as to maintain the viscosity of the electrocoating bath within very narrow limits and at the same time to maintain the temperature of the bath within a predetermined range.

Another object of the instant process is to permit operation of the cathode compartment at a lower electrical resistance, simultaneously permitting the use of essentially pure water to flush mobile ions out of the compartment, thus preventing a back-migration of anions, whether hydroxyl or derived from the ionization of salts (sulfate, carbonate and the like), or residual anions from priming the ion exchange resin (chloride, sulfate or the like), by utilizing an essentially fully neutralized (with cations) ion exchange resin in fluid communication with a cathode in a cathodic compartment separate from an anodic coating bath by a semi-permeable optionally conductive membrane.

It is yet another object of the instant invention to provide a process which utilizes an essentially fully loaded (with cations) ion exchange resin in fluid communication with a cathode in a cathodic compartment separated from an anodic coating bath by a cation exchange membrane, to lower the resistance of the cathode compartment without the necessity of the addition of salts to perform a similar function.

It is a further object of the instant invention to provide a process for electrocoating an article interposed between oppositely disposed cathodes in cathode compartments within an electrocoating bath, said cathode compartments having sufficiently low electrical resistance so as to minimize the leakage of current to the walls of the electrocoating bath, and being separated from said electrocoating bath by a semi-permeable, optionally conductive membrane by channeling the current flowing between the anode and cathode thus minimizing the leakage of current to the walls of the electrocoating bath.

PREFERRED EMBODIMENT OF THE INVENTION

The instant invention is particularly described herein with regard to carboxylic paints which are solubilized with lithium hydroxide. The initial paint composition contains enough base to give aqueous dispersibility, necessary stability and superior deposition quality. The ratio of moles of lithium hydroxide to moles of free carboxyl groups is in the range from about 0.35 to about 1.00 in the initial paint formulation; additional quantities of makeup paint maintain the desired ratio which is a measure of the ratio of carboxyl groups in the resin which have been neutralized, to carboxyl groups which have not been neutralized. Whether or not a resin is fully neutralized depends upon the characteristics of the resin in the bath; the goal is to operate with a resin which is essentially 100% solubilized irrespective of what percent is neutralized. Conventionally, depending upon the percent neutralization required for a particular resin in a fully solubilized bath, about 80% of lithium hydroxide initially associated with the bath will be regenerated during electrocoating, forming free lithium ions which are present in the anodic coating bath. Conventionally, after the coating bath has been depleted to a predetermined content, additional makeup material is added to the bath, which makeup material is only 20% solubilized. That is, it is solubilizer-deficient so as to take advantage of the regenerated base ions in the bath which, together with the solubilizer in the makeup paint is purported to provide 100% solubilization. However, the problem with using a solubilizer-deficient makeup material is that the makeup material is barely solubilized with such a low quantity of solubilizer and sometimes it is not solubilized at all. Further, reconstitution with solubilizer-deficient make-up paint is tedious, and there is a considerable time lag between the time the 20% solubilized make-up material achieves 100% solubilization required in the bath; during this time lag, the uniform coating of articles in the bath is severely disrupted.

It is a characteristic of paints which require lithium hydroxide solubilizer that, in general, a co-solvent must be employed. This is a cumbersome handling problem and a distinct disadvantage. Particularly where the lithium hydroxide stabilizer competes in the market place with amine solubilized systems which can sometimes be reconstituted without a co-solvent, the ability to minimize the use of a co-solvent is a very distinct advantage. The instant invention permits the use of lithium hydroxide solubilizer with a greatly reduced amount of co-solvent, and in some instances, with essentially no co-solvent.

In a particular embodiment of the instant invention, utilizing an apparatus illustrated in FIG. 1, a cationic membrane 1 divides the cathodic compartment 2 from the electrocoating paint bath 3 wherein an anode 4 is the article on which paint is to be deposited. A fluid-permeable ion exchange resin 5 is in fluid contact with the cathode 6 in the cathode compartment 2. A particularly suitable ion exchange resin is Dowex 50W–X8 in the hydrogen form, which is a common strong acid-type ion exchange resin composed of sulfonated polystyrene cross-linked with divinyl benzene. During use the resin is gradually converted to the salt form by the alkali metal ions which are ion exchanged into the resin. It will be noted that since the membrane is cationic membrane, migration of negative ions, particularly of $OH^-$ ions, out of the cathode compartment is prevented. Trapping the negative ions is simple since the negative charges on the ion exchange resin are, by nature, immobile, except of course, they may rotate or move around a fixed point on the ion exchange resin backbone.

Exhausted ion exchange resin may be regenerated without removal from the cathode compartment 2, as described hereinafter, or it may be regenerated by removing the ion exchange resin 5 from the cathode compartment 2, treating it in a separate operation and subsequently returning the regenerated ion exchange resin to the cathode compartment. Alternatively, the cathode compartment 2 may be fitted with an auxiliary platinum anode 7 on one side of the ion exchange resin, and a stainless steel auxiliary cathode 8 on the other side. Disposed in between said auxiliary platinum anode 7 and said auxiliary stainless steel cathode 8 is at least one selective electrodialysis membrane 9 and preferably another one 12 which together with the cationic ion exchange membrane 1, effectively contains the ion exchange resin. The electrodeposition current flows from the objects to be coated, anode 4, to the stainless steel cathode 6. An auxiliary direct current is applied between the auxiliary electrodes, the direction of the current being, orthogonal to the direction of the electrodeposition current. This current is conveniently termed the regeneration current. When the regeneration current is imposed across the neutralized ion exchange resin, hydrogen ions are generated at the auxiliary platinum anode by electrolysis of water, and they migrate toward the auxiliary cathode 8 across the ion exchange resin; the lithium ions in the resin also migrate toward the auxiliary cathode 8. When the lithium ions are discharged at the auxiliary cathode, lithium hydroxide is formed. The migration of $[OH^-]$ ions toward the auxiliary anode is retarded because of the cationic membrane 9, and the current efficiency is thereby increased. Imposition of the regeneration current regenerates the ion exchange resin to the acid form, and the lithium hydroxide formed at the stainless steel auxiliary cathode is withdrawn at 10 from near the auxiliary cathode 8 for reuse. The neutralized ion exchange resin is preferably regenerated when the electrodeposition current is switched off, that is, when the electrodeposition bath is not being used for coating. However, the regeneration current may be imposed across the neutralized ion exchange resin even while the electrocoating bath is in use as long as the potential drop across the cathode compartment 2 is smaller than the potential drop across the electrocoating bath 3. Useful cathode exchange resins are those with a specific resistance in a range of about 50 to 300 ohm-cm. Essentially fully solubilized feed makeup material is introduced into the anode compartment at any convenient point 11, either intermittently or continuously. A most preferred method of operation is shown in FIG. 1 and utilizes two cathodes in compartments at opposite ends of the bath and the anode to be coated between them. A small quantity of sulfuric acid, or more preferably an ion exchange resin (because of danger of sulfate contamination of the bath), in the auxiliary compartment helps carry the current during regeneration.

Figure 2:
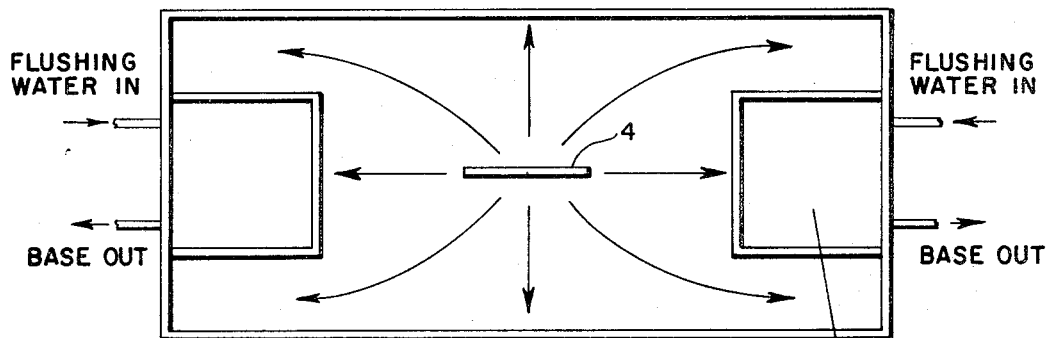
Figure 3:
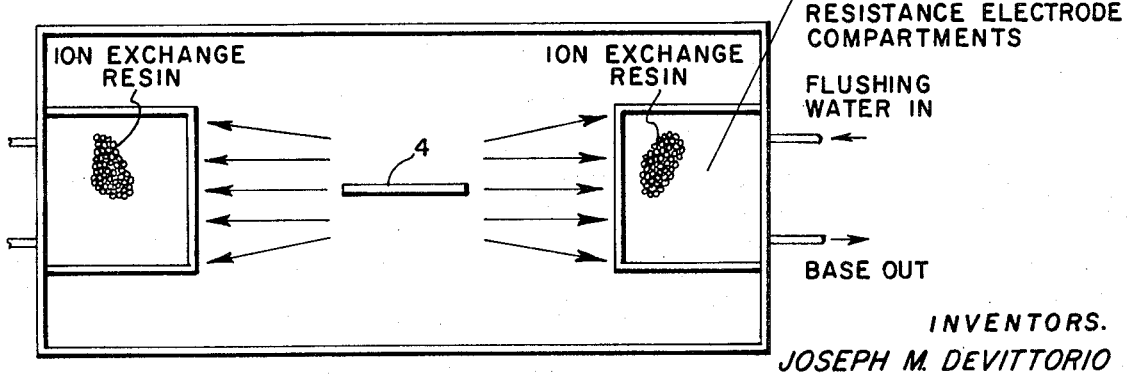

In a conventional process such as the Ford Electrocoating Process referred to hereinbefore, the cathode constitutes a relatively high resistance area and leakage of electrical current to the walls of the electrocoating bath is so serious as to necessitate lining the interior of the bath with a non-conductive material. Flow of current in such a bath is relatively diffused, as diagrammed in FIG. 2. The higher voltage necessitated gives higher heat generation (since heat is a function of the product of voltage, current and time duration of current), which in turn leads to rupturing of the liner of the electrocoating bath. If such a rupture of the liner does occur, enormous leakage of electrical current results which upsets operation of the bath and adds to the cost of operation. In the most preferred embodiment of the instant invention, referred to hereinbefore, where cathode compartments are disposed on opposite sides of the work piece on which the film is to be electrodeposited, the current is channeled directly to the cathodes in the cathode compartments which are low resistance areas, as diagrammed in FIG. 3, eliminating the disadvantages of the prior art operation under high voltage.

Where either an unneutralized ion exchange resin or a fully neutralized, or loaded, ion exchange resin is used in combination with an ion exchange membrane, solely for the purpose of decreasing the resistance of the cathode compartment, at the same time utilizing flushing to remove solubilizer ions, a similar channeling of electrical current is effected. Even when the perma-selective conductive ion exchange membrane is replaced with a non-conductive regenerated cellulose membrane, the presence of the ion exchange resin continues to provide the channeling effect because resistance in the cathode area is lowered. It will be immediately recognized that, whether or not a conductive or non-conductive membrane is utilized, flushing of the compartment substantially eliminates back-flow of ions through the membrane: it will be apparent that back-flow is more effectively stopped if an ion exchange membrane is used instead of a regenerated cellulose membrane, at a particular concentration of mobile ions in the compartment.

Where the loaded ion exchange resin is to be regenerated prior to reuse, it may be removed from the cathode compartment and acid treated in a vessel outside, restoring it to the acid form. Most preferably, the loaded ion exchange resin may be regenerated in a regeneration compartment outside the coating bath. The regeneration compartment or cell contains a platinum cathode isolated from the loaded cation exchange resin in an aqueous suspension, by a cationic membrane, and a platinum anode isolated from the loaded cation exchange resin by a non-conductive membrane, such as one made from regenerated cellulose. Upon passage of the regeneration current, hydrogen ions are generated at the anode and contact the ion exchange resin, regenerating it. Simultaneously, lithium ions are pulled into the cathode compartment forming lithium hydroxide which may be withdrawn. The cationic membrane isolating the platinum cathode serves to block the back-migration of $OH^-$ ions towards the anode, particularly where the concentration of lithium hydroxide in the cathodic compartment is relatively high. Even if there was some back-migration of $OH^-$ ions through the cationic membrane, they would encounter $H^+$ ions and be destroyed.

Where a loaded ion exchange resin is used in the cathode compartment of an electrocoating bath wherein a continuous flush is utilized to remove lithium ions, it is desirable to recover the lithium ions. This may be accomplished by removing the basic flushing water containing the lithium ions from the cathode compartment and passing the water through an ion exchange resin in its acid form, contained in a regeneration cell equipped as described hereinabove. The flow of basic water to the cell may be continuous or intermittent. Regeneration current, applied as described hereinbefore, results in the formation of lithium hydroxide in the cathode compartment of the regeneration cell, which may be withdrawn.

In the following examples, all parts referred to are parts by weight unless specifically denoted otherwise. The term "resistance" is used herein for specific resistance (and is measured in ohm-cm.).

EXAMPLE 1

Ion exchange resin in regenerated cellulose cathode compartment

Stainless steel electrodes, the back portions of which were taped with non-conductive adhesive tape, were placed in compartments the walls of which consisted of "Zephyr" regenerated cellulose membranes made by Union Carbide Corporation. The compartments were filled with a strong-acid type ion exchange resin such as Dowex 50 W-X8 in acid form, which was first washed with a one molar solution of hydrochloric acid and then rinsed repeatedly with distilled water until the pH remained constant at about 3.5. The stainless steel electrode functions as the cathode and the ion exchange resin-filled compartment is referred to as the cathode compartment. Cathode compartments were disposed within an electrodeposition bath, each adjacent to opposite walls.

The paint bath surrounding the cathode compartments consisted essentially of an acrylic enamel resin pigmented with $TiO_2$ at about 12% pigment volume concentration. The paint was fully solubilized with a 10% solution of lithium hydroxide at 33% neutralization, which means that 33% of the carboxyl groups were neutralized. A recipe for a typical anolyte bath solution is as follows:

|  | Lbs. |
|---|---|
| Acrylic enamel resin 70% solids | 65.2 |
| Titanium dioxide pigment | 29.0 |
| Butyl Cellosolve | 11.0 |
| Melamine resin | 11.5 |
| 10% lithium hydroxide solution | 15.0 |
| Deionized water | 744.9 |

Depositions were carried out at constant voltage on aluminum panels so that approximately a one mil thick film was deposited in 60 secs. Appearance of the coating was very good both initially as well as at the end.

TABLE 1

| Non volatile material N.V.M., percent | Weight of paint in bath, gm. | Solids in paint, gm. | Solids used or added, gm. | Meq. Li+ gm. solids [1] | pH | Resistance R, ohm-cm[2] |
|---|---|---|---|---|---|---|
| 10.2 | 854 | 87.8 |  | 0.42 | 6.7 | 88. |
| 6.05 | 860 | 52.1 | 35.7 |  | 6.7 | 1,462 |
| 10.1 | 862 | 87.1 | 35.0 | .46 | 6.7 | 906 |
| 6.40 | 825 | 52.9 | 34.2 |  | 6.7 | 1,226 |
| 10.1 | 864 | 87.2 | 34.3 | 0.48 | 6.6 | 915 |

No. of turnovers = 69.9/87.8 = 0.80

$$\text{Rate of Li}^+ \text{ removal} = \frac{\text{initial} + \text{added} - \text{final}}{\text{paint solids used}} = \frac{\text{meg. Li}^+}{\text{gm. solids}}$$

$$= \frac{(8.87 \times 0.42) + (69.3 \times 0.42) - (87.2 \times 0.48)}{69.9}$$

$$= \frac{0.344 \text{ meg. Li}^+}{\text{gm. solids}}$$

Solubilization efficiency = $\frac{0.344}{0.420}$ = 82%

[1] Meq. lithium/gm. solids is a measure of the $COO^-$ content of the paint. An aliquot is taken, dissolved in tetrahydrofuran, and titrated potentiometrically with methanolic HCl to a predetermined endpoint. The [COO] is indirectly measured, but in the absence of contaminating ions, the lithium ion concentration is equal to the [$COO^-$] concentration.
[2] All resistance measurements corrected to 75° F., though bath temperatures varied from 70 to 80° F.

EXAMPLE 2

Electrodeposition with permselective ion-exchange membrane by itself

A cathode compartment [1] was fabricated using a cationic membrane such as Ionac MC 3235 the specifications on which are as follows (taken from Ionac Product Bulletin IS-S-2,4):

| | |
|---|---|
| Electrical resistance (ohm-cm.[2], A.C. measurement) | MC-3235 |
| 0.1 N NaCl | 18 |
| 1.0 N NaCl | 18 |
| Percent permselectivity (0.5 N NaCl/1.0 N NaCl) | 95.3 |
| Water permeability ml./hr./ft.[2]/30 p.s.i. | Negligible |
| Membrane thickness (mils) | 12 |
| Capacity: | |
| Meq./g. | 1.26 |
| Meq./cm.[2] | 0.045 |

[1] The back of the cathode compartment was taxed.

No ion-exchanged resin was utilized in the cathode compartment, which was flushed with deionized water.

The anolyte paint composition was the same as in Example 1. The general appearance of the coating in the panels was very good, both initially and at the end.

The following results were obtained:

TABLE 2

| N.V.M., percent | Bath solids, gm. | Bath solids, pH | Bath solids, pH | pH | Resistance R, ohm.-cm. |
|---|---|---|---|---|---|
| 12.16 | 431 | | | 8.12 | 960 |
| 11.15 | 395 | 36 | | | |
| 11.72 | 416 | | 21 | .764 | 925 |
| 11.05 | 392 | 24 | | 7.52 | 990 |
| 11.71 | 416 | | 24 | 7.55 | 935 |
| 10.60 | 376 | 40 | | 7.44 | 970 |
| 10.70 | 390 | | 14 | 7.55 | 900 |
| 10.10 | 358 | 32 | | 7.55 | 960 |
| 11.92 | 423 | | 65 | 7.90 | 875 |
| 10.79 | 383 | 40 | | 7.71 | 1010 |
| 11.23 | 399 | | 16 | 7.92 | 805 |
| 10.53 | 376 | 23 | | | |
| Total | | 195 | 140 | | |

$$\frac{\text{Initial meq. Li}^+}{\text{Gm. solids}} = 0.361; \frac{\text{final meq. Li}^+}{\text{gm. solids}} = 0.416$$

$$\text{Rate of Li}^+ \text{ removal} = \frac{\text{initial} + \text{added} - \text{final}}{\text{paint solids u}} = \frac{\text{meq. Li}^+}{\text{gm. solids}}$$

$$= \frac{431(0.361) + 140(0.361) - 376(0.416)}{195}$$

$$= 0.2562$$

$$\text{Solubilization efficiency} = \frac{0.2562}{0.3610} = 71\%$$

The concentration of LiOH in the cathode compartment ranged from $0.4 \times 10^{-2}$ moles/liter to $1.8 \times 10^{-2}$ moles/liter and resistance R ranged from about 1270 ohm-cm. to about 350 ohm-cm.

EXAMPLE 3

Cation-exchange membranes in conjunction with ion-exchanged resin

Cathode compartments were fabricated with Ionac Mc 3235 as in Example 2 hereinabove and filled with astrong-acid type ion exchange resin, Dowex 50 W–X8 in the acid form. Stainless steel electrodes were used as cathodes, the backs of which were taped with non-conductive adhesive tape as before. The same paint composition used in Example 1 was used in the bath. Aluminum panels were used and deposition was carried out at constant voltage (60 volts) so as to apply about a 0.9 mil film in 90 seconds.

Analysis of the paint bath at various intervals indicated that all samples remained within the range of experimental error of the method used to determine lithium ion concentration during the course of the experiment. The ion-exchanged resin remained stable during the entire period. No trace of sulfur or chlorine was found in the bath when checked by X-ray spectrographic analysis. The lithium ion content was determined by automatic potentiometric titration of the acrylic vehicle with a 0.01 N methanolic HCl solution. The gloss and appearance initially and at the end, were excellent, satisfying the main requirement of a finish coat.

The following results were obtained:

TABLE 3

| No. of panel | Nonvolatile material NVM, percent | Meq. Li$^{+1}$ gm solids | Resistance R | pH | Weight paint, gms. | Paint solids in cell, gms. | Paint solids used, gms. | Panel gloss |
|---|---|---|---|---|---|---|---|---|
| A-1 | 9.07 | 0.47 | 1,000 | 6.7 | 1,113 | 101 | | 79 |
| A-29 | 7.99 | 0.44 | 1,085 | 6.7 | | | | 78 |
| A-47 | 6.26 | | 1,263 | 6.75 | 1,091 | 68 | 33 | 78 |
| A-47 | 10.2 | 0.42 | 860 | 6.6 | | | | |
| A-47 | 12.07 | | 950 | 6.6 | 1,142 | 138 | | |
| A-93 | 9.06 | 0.43 | 1,115 | 6.7 | 1,083 | 98 | 40 | 70 |
| A-93 | 11.92 | 0.40 | 900 | 6.65 | 1,135 | 135 | | |
| A-137 | 9.53 | 0.44 | 960 | 6.65 | 972 | 93 | 42 | 30 |
| A-142 | 11.67 | 0.45 | 865 | 6.6 | 1,152 | 135 | | 30 |
| A-205 | 8.18 | 0.46 | 1,125 | 6.65 | 1,002 | 82 | 53 | |
| A-205 | 11.41 | | 800 | 6.65 | 1,122 | 128 | | 80 |
| A-270 | 8.09 | 0.48 | 1,110 | 6.50 | 977 | 79 | 49 | 80 |
| A-278 [2] | 12.25 | | 820 | 6.55 | 1,129 | 137 | | |
| A-299 | 10.34 | [2] 0.45 | 1,150 | 6.70 | 1,043 | 108 | 29 | 80 |
| A-344 | | | 1,125 | 6.7 | 975 | 77 | 31 | 75 |
| A-344 | 11.90 | | 900 | 6.70 | 1,118 | 133 | | |
| A-349 | 10.93 | 0.47 | 865 | 6.70 | 1,030 | 113 | 20 | 80 |
| Total solids entered | | | | | | | 309 | |
| Total solids used in coating | | | | | | | 297 | |

Rate of removal of lithium ions = $\frac{\text{total equius. Li}^+ \text{ removed during coating}}{\text{total solids used}}$ $$= \frac{[(\text{initial solids})(\text{initial meq. Li}^+/\text{gm. solid}) + (\text{total solids entered})(\text{meq. Li}^+/\text{gm. solid of makeup [3] material}) - (\text{final solids})(\text{final meq. Li}^+/\text{gm. solid})]}{\text{total solids used}}$$

$$= \frac{[(101 \text{ gm.})(0.47 \text{ meq. Li}^+/\text{gm. solids}) + (309 \text{ gm.})(0.47 \text{ meq./gm. solid}) - (113 \text{ gm.})(0.47)]}{297 \text{ gm.}}$$

$= 0.47$ meq./gm. solids

Rate of entering Li$^+$ = 0.47 meq. Li$^+$/gm. solids

Solubilization efficiency = $\frac{\text{Rate of removing Li}^+}{\text{Rate of entering Li}^+} = \frac{0.47 \text{ meq./gm. solids}}{0.47 \text{ meq./gm. solids}} = 100$ percent No. of turnovers for the bath = $\frac{297}{101} = 2.94$

[1] Average of 2 titrations.
[2] Average of 4 titrations.
[3] Same as initial.

EXAMPLE 4

Cation exchange membranes in conjunction with ion-exchange resin

Cathode compartments were fabricated using Ionac Mc 3235 as in Example 3 hereinabove and filled with Dowex 50 W–X8 (acid form). Stainless steel cathodes were used as before.

A polyester primer with medium chrome yellow and molybdate orange pigments together with an alkoxy melamine, was formulated with lithium hydroxide as the solubilizer for use in an electrodeposition bath as follows:

| | Lbs. |
|---|---|
| Acid TMPD polyester resin, 85% solids | 440 |
| Medium chrome yellow pigment | 209 |
| Molybdate orange pigment | 6 |
| Melamine resin | 62.9 |
| Butyl Cellosolve | 94 |
| 10% LiOH·$H_2O$ | 90 |
| Deionized water | 4914 |

Conditions of deposition: About 60 volts were used at constant voltage to get approximately 1 mil film thickness over iron and phosphated steel panels during 60 seconds.

Paint with the above formulation is used as a corrosion resistant primer because it exhibits very high salt spray resistance, but it is impossible to reconstitute by conventional methods using lithium hydroxide. The following results were obtained:

X-ray spectrographic analysis of the paint bath and the paint deposited on the anode failed to show any trace of interfering sulfur, chloride ions, and the gloss of all panels was uniformly excellent. Accelerated tests for salt spray resistance indicated that the salt spray resistance of the film deposited by this process was at least as good as that deposited by known means.

EXAMPLE 5

Use of ion-exchange membrane with neutralized ion-exchange resin in cathode compartment equipped for continuous flushing Cathode compartments were fabricated using Ionac MC 3235 cation exchange membrane. Dowex 50 W–X8, strong-acid type ion-exchange resin was neutralized with lithium hydroxide and then rinsed with deionized water. The cathode compartment was continuously flushed with deionized water during electrodeposition at the rate of 1 liter per hour for each compartment. A 50 ounce cell was used and the paint in the bath was the same white acrylic paint composition used in Example 1. The resistance across the cathode compartment, with the loaded ion exchange resin in it, was low. The deposition voltage across the bath was 60 volts with or without the presence of the cathode compartment containing the loaded resin, indicating that resistance of the bath displaced was the same as the cathode compartment resistance. As will be seen from Example 6, hereinafter, the resistance across the cathode compartment, containing either loaded resin or resin in the acid form is essentially the same. The gloss on the initial panels was 80° at 1 mil film thickness, and remained at 80° after several turnovers. Panels coated as described in this example showed no adverse effects in tests for salt spray resistance. Paint added during electrodeposition was 100% solubilized. The following results were obtained:

TABLE 4

| NVM, percent | Weight paint, gm. | Weight paint solids | Weight paint solids used | Weight paint solids added | pH | R, ohm-cm. | Zeta potential, millivolts |
|---|---|---|---|---|---|---|---|
| 11.69 | 1,047 | 122.2 | | | 7.3 | 675 | 46.2 |
| 6.64 | 848 | 56.2 | 66.0 | | 7.7 | 920 | 39.0 |
| 10.99 | 1,047 | 115.0 | | 58.8 | 7.5 | 620 | 45.2 |
| 6.96 | 857 | 59.6 | 55.4 | | 7.4 | 890 | |
| 12.49 | 1,147 | 143.0 | | 83.4 | 7.4 | 626 | |
| 7.44 | 931 | 69.2 | 73.8 | | 7.6 | 725 | |
| 11.22 | 1,147 | 128.5 | | 59.3 | 7.4 | 680 | |
| 10.16 | 1,038 | 105.3 | 23.2 | | 7.4 | 700 | 47.0 |
| Total | | | 218.4 | 201.5 | | | |

$$\frac{\text{Initial meq. Li}^+}{\text{gm. solids}} = 0.47; \quad \frac{\text{Final meq. Li}^+}{\text{gm. solids}} = 0.56$$

Rate of removal of Lithium ions (calculated as in previous example)

$$= \frac{(122.2 \text{ gm.} \times \frac{0.47 \text{ meq. Li}^+}{\text{gm. solids}}) + (201.5 \text{ gm.} \times \frac{0.47 \text{ meq. Li}^+}{\text{gm. solids}}) - (105.3 \text{ gm.} \times \frac{0.56 \text{ meq. Li}^+}{\text{gm. solids}})}{218.4 \text{ gm.}}$$

$$= \frac{0.427 \text{ meq. Li}^+}{\text{gm. solids}}$$

Solubilization or reconstitution efficiency $= \frac{0.427}{0.470} = 91$ percent No. of turnovers $= \frac{218.4}{122.2} = 1.79$

TABLE 5

| N.V.M., percent | Weight of paint, gm. | Solids added, gm. | Solids, in paint, gm. | Solids used, gm. | pH | Bath resistance, ohm-cm. |
|---|---|---|---|---|---|---|
| 11.19 | 1,152 |  | 129 |  | 6.7 | 850 |
| 7.39 | 1,082 |  | 80 | 49 | 6.7 | 1,225 |
| 11.91 | 1,133 | 55 | 135 |  | 6.8 | 832 |
| 7.45 | 980 |  | 73 | 62 | 6.7 | 1,172 |
| 11.14 | 1,095 | 49 | 122 |  | 6.7 | 883 |
| 9.05 | 1,007 |  | 91 | 31 | 6.6 | 1,067 |
| 12.29 | 1,140 | 49 | 140 |  | 6.6 | 842 |
| 8.07 | 1,017 |  | 82 | 58 | 6.7 | 1,147 |
| 11.56 | 1,132 | 49 | 131 |  | 6.7 | 912 |
| 7.26 | 993 |  | 72 | 59 | 6.7 | 1,270 |
| 10.58 | 1,153 | 50 | 122 |  | 6.6 | 1,000 |
| 8.05 | 1,059 |  | 85 | 37 | 6.8 | 1,160 |
| 11.90 | 1,110 | 47 | 132 |  | 6.6 | 900 |
| 7.30 | 1,027 |  | 75 | 57 |  |  |
| Total |  | 299 |  | 353 |  |  |

Initial lithium = $\frac{0.44 \text{ meq. Li}^+}{\text{gm. solids}}$; Final lithium; $\frac{0.537 \text{ meq. Li}^+}{\text{gm. solids}}$ Rate of lithium removal (calculated as in previous examples)
= (129 gm. × $\frac{0.44 \text{ meq. Li}^+}{\text{gm. solid}}$) + (299 gm.) $\frac{(0.44 \text{ meq. Li}^+)}{\text{gm. solid}}$ − (75 gm.)

$$\frac{(0.537 \text{ meq. Li}+)}{\text{gm. solid}}$$

353 gm.

= 0.419

Solubilization efficiency = $\frac{0.419}{0.440}$ = 95.2 percent

In the above example no back-migration of ions from the cathode compartment was detectable.

When electrodeposition was carried out as described in the above Example 5, except that the cathode compartment contained no ion exchange resin, the bath resistance was significantly higher indicating that the resistance across the cathode compartment was much higher than when it was filled with loaded ion-exchange resin. Again when the electrodeposition was carried out with the same paint composition as in this Example 5, except that trace quantities of ammonium chloride (50 p.p.m.) were added to the cathode compartment which contained no ion-exchange resin, the bath resistance was lowered indicating that the resistance of the cathode compartment was lower, but sufficient back-migration of chloride ions occurred so as to lower the gloss on the panels to an unacceptable level.

EXAMPLE 6

Measurement of specific resistance across cathode compartment with ion exchange resins A conductivity cell was constructed to measure specific resistance of a strong-acid type ion exchange resin both in the acidic and neutral forms. Additionally, the resistance of deionized water-wash from the neutral samples was obtained. Resistances in the conductivity cell were measured by an AC Bridge with the frequency of 1000 Hz. The specific resistance in each case was obtained by multiplying the measured resistance by the cell constant. It will be seen that the specific resistance of the water and resin, whether neutralized or not, is much less than that of either the resin alone or the water-wash from the neutralized resin.

TABLE 6

| Ion exchange resin type | Resin alone | Water and unneutralized resin | Water and neutralized resin | Water-wash from neutralized resin | pH of water-wash |
|---|---|---|---|---|---|
| Dowex 50WX2 | 2.4×10³ | 230 | 80 | 5.5×10³ | 3.5 |
| Dowex 50WX8 | 320 | 240 | 150 | 4.8×10³ | 3.5 |
| Dowex 50WX12 | 320 | 180 | 100 | 1.2×10⁴ | 3.0 |

We claim:

1. A process of electrodeposition of a film-forming material which comprises passing an electric current through an aqueous dispersion containing ionized film-forming material and ions of opposite charge from said ionized film-forming material, between an article to be coated and at least one other electrode, said other electrode being in fluid contact with a fluid-permeable ion exchange resin having ions exchangeable with said ions of opposite charge, said other electrode and said fluid-permeable ion exchange resin being together separated from said aqueous dispersion by an ion exchange membrane selectively permeable to said ions of opposite charge which permeate said ion exchange membrane and are exchanged upon said ion exchange resin.

2. The process of claim 1 wherein said ion-exchange resin in fluid contact with said another electrode is a strong-acid type of ion-exchange resin and the solubilizer is an alkali metal hydroxide.

3. The process of claim 2 wherein said electrodeposition bath is operated until said strong-acid type ion-exchange resin is sufficiently loaded, or ion-exchanged with alkali metal cations, to require regeneration, at which time said ion-exchange resin is removed from said film-forming material-free zone, is regenerated exteriorly from, and independently of, said electrodeposition bath, and is returned to said film-forming material-free zone for re-use in said electrodeposition bath.

4. The process of claim 1 wherein said fluid permeable ion-exchange resin is disposed between two auxiliary electrodes between which an electric current is passed in a direction orthogonal to the direction of the electrocoating current, optionally when said electrocoating current is flowing, said ion exchange resin being constrained by at least one secondary ion-exchange membrane selectively permeable to the same ions to which said first ion-exchange membrane is selectively permeable.

5. The process of claim 1 wherein a plurality of said other electrodes are utilized, oppositely disposed from one another keeping said article interposed between them, so as to channel electric current flowing between said other electrodes and said article to minimize the leakage of electric current to the walls of the electrocoating bath.

6. In a continuous method of electrocoating, wherein electrically conductive objects are passed through an aqueous coating bath comprising a dispersion of a synthetic resinous film-forming material ionizable into an essentially water-insoluble moiety and a cation, in the presence of a water-soluble solubilizer in an amount sufficient to at least partially neutralize the resin, having a cathode in electrical and fluid communication with an anode, each of said objects while passing through said bath serving as an anode, and wherein the direct flow of electric current is provided between said cathode and said anode while counter ions are released in said bath as cations, the improvement consisting essentially of interposing a first cation exchange membrane, permeable to said liberated cation moiety of said solubilizer but substantially impermeable to said resin and to anions, between said cathode and anode, forming a first coating zone containing said dispersion, and a second substantialy dispersion-free zone containing a fluid-permeable ion exchange resin in fluid-contact with said cathode, said cation exchange resin being in a condition to react with said released counter ions thereby maintaining the viscosity and temperature of the electrocoating bath within predetermined limits.

7. A process of electrodeposition of an essentially fully solubilized film-forming material which comprises passing an electric current between an article to be coated and another electrode in an aqueous dispersion containing ionized resinous film-forming material and counter ions, said another electrode being in fluid contact with a fluid-permeable ion exchange resin in a substantially film-forming material-free zone, separated from said aqueous dispersion of resinous film-forming material by a semi-permeable ion exchange membrane selectively permeable to said counter ions, which permeate said membrane and are ion exchanged on said ion exchange resin, continuing the electrodeposition of film-forming material until such time as the bath is sufficiently depleted of said film-forming material, then adding from about 90 to 100 percent solubilized film-forming material as make-up feed to the bath.

8. A process of electrodeposition of an essentially fully solubilized film-forming material which comprises passing an electric current through an aqueous dispersion containing ionized film-forming material and ions of opposite charge from said ionized film-forming material, between an article to be coated and another electrode, said another electrode being in fluid contact with a fluid-permeable essentially fully neutralized ion-exchange resin, in a substantially resin-free zone, separated from said aqueous dispersion of resinous film-forming material by a dialysis membrane permeable to water and solubilizer material within said bath and substantially impermeable to said resinous film-forming material, said ions of opposite charge permeating said permeable membrane and being neutralized in said film-forming material-free zone in the vicinity of said another electrode, forming an aqueous solution, and flushing away said aqueous solution with essentially pure water, yet maintaining a relatively low specific resistance in the vicinity of said another electrode.

9. The process of claim 8 wherein said aqueous solution leaving said cathode compartment is alkaline and is contacted with a strong-acid type ion exchange resin in fluid contact with a cathode and an anode, said cathode being separated from said ion exchange resin by a conductive semi-permeable cation exchange membrane and said anode being separated from said ion exchange resin by a semi-permeable, optionally conductive membrane, and simultaneously passing an electric current between said anode and said cathode causing cations to infiltrate said cation exchange membrane and being discharged in the vicinity of said cathode to form a basic solution and withdrawing said basic solution.

10. The process of claim 8 wherein said specific resistance is in the range of 100 to 1000 ohm-cm.

11. A process of electrodeposition of an essentially fully solubilized film-forming material which comprises passing an electric current through an aqueous dispersion containing ionized film-forming material and ions of opposite charge from said ionized film-forming material, between an article to be coated and another electrode, said another electrode being in fluid contact with a fluid-permeable essentially fully neutralized ion-exchange resin, in a substantially film-forming material-free zone, separated from said aqueous dispersion of resinous film-forming material by an ion-exchange membrane permeable to said ions of opposite charge and substantially impermeable to said resinous film-forming material, said ions of opposite charge permeating said ion-exchange membrane and being neutralized in said film-forming material-free zone in the vicinity of said another electrode, forming an aqueous solution with essentially pure water, progressively concentrating said aqueous solution, yet maintaining a relatively low resistance in the vicinity of said another electrode.

12. The process of claim 11 wherein said specific resistance is in the range from 100 to 1000 ohm-cm.

13. The process of claim 11 wherein said ion-exchange membrane is a cation exchange membrane and said aqueous solution is a basic solution.

References Cited
UNITED STATES PATENTS

| | | | |
|---|---|---|---|
| 3,419,488 | 12/1968 | Cooke | 204—181 |
| 3,591,478 | 7/1971 | Erickson | 204—181 |

HOWARD S. WILLIAMS, Primary Examiner

U.S. Cl. X.R.

204—180 B

UNITED STATES PATENT OFFICE
CERTIFICATE OF CORRECTION

Patent No. 3,682,806　　　　　　　　Dated August 8, 1972

Inventor(s) THOMAS P. KINSELLA and JOSEPH M. DeVITTORIO

It is certified that error appears in the above-identified patent and that said Letters Patent are hereby corrected as shown below:

Column 2, Line 28, "equality" should read -- quality --.

Column 12, Table 1, last column entitled "Resistance R, ohm-cm$^2$" should read:

```
  --   882
      1466
       906
      1225
       912 --.
```

Column 12, Line 45, this part of equation should read:

-- $(87.8 \times 0.42)+(69.3 \times 0.42)-(87.2 \times 0.48)$ --.

Column 12, Line 67, parts by weight for 1.0 N NaCl should be -- 11 -- (not 18).

Column 13, Table 2, the second and third column headings should read:

-- Bath solids, used -- and -- Bath solids, added --, respectively.

Column 13, Line 24, "u" should read -- used --.

Column 13, third item under column entitled "pH" of Table 2, ".764" should read -- 7.64 --.

Signed and sealed this 23rd day of January 1973.

(SEAL)
Attest:

EDWARD M. FLETCHER, JR.
Attesting Officer

ROBERT GOTTSCHALK
Commissioner of Patents